G. W. BENTON.
AUTOMOBILE STEERING MECHANISM LOCK.
APPLICATION FILED JAN. 26, 1911.
1,004,973.
Patented Oct. 3, 1911.
2 SHEETS—SHEET 1.
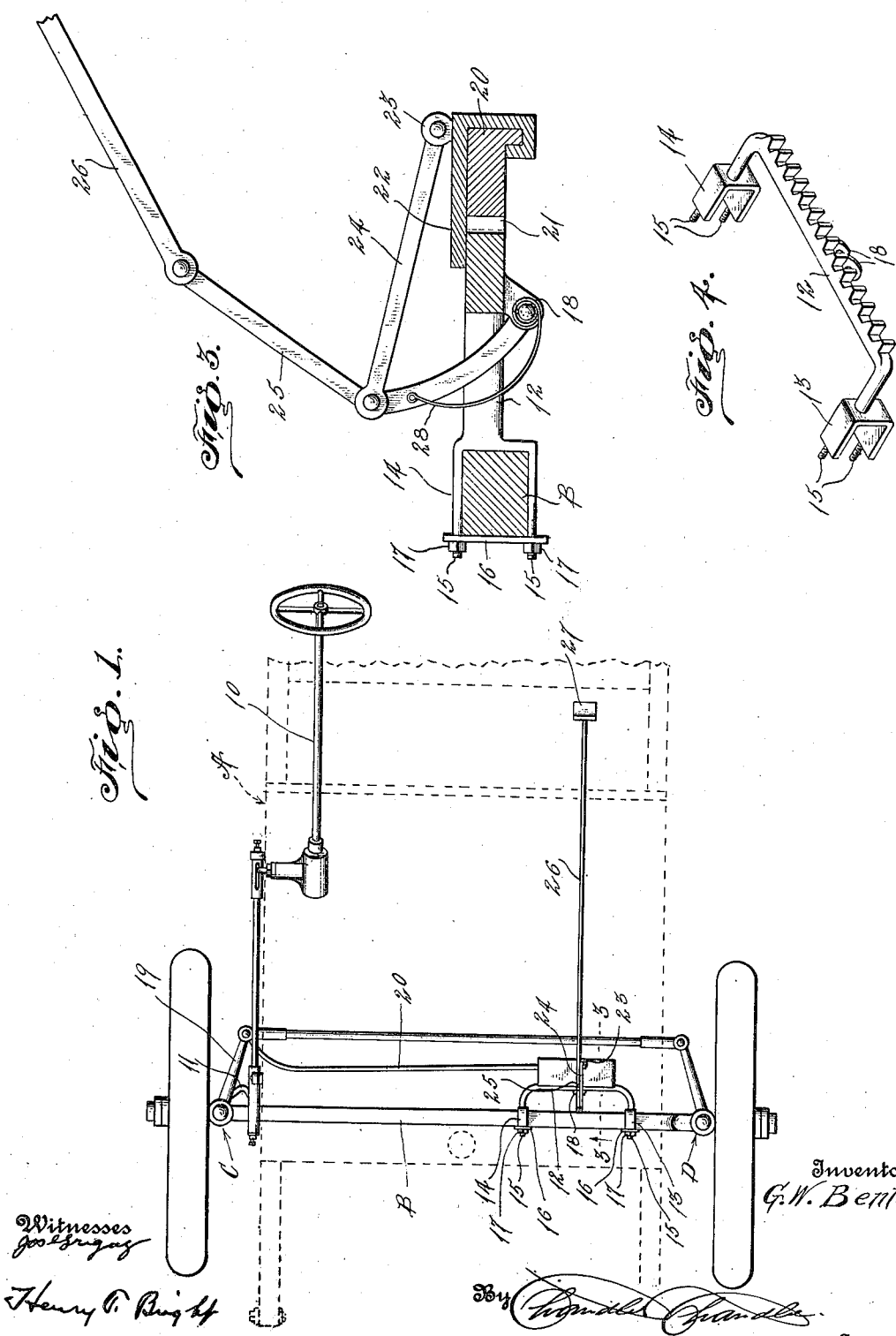

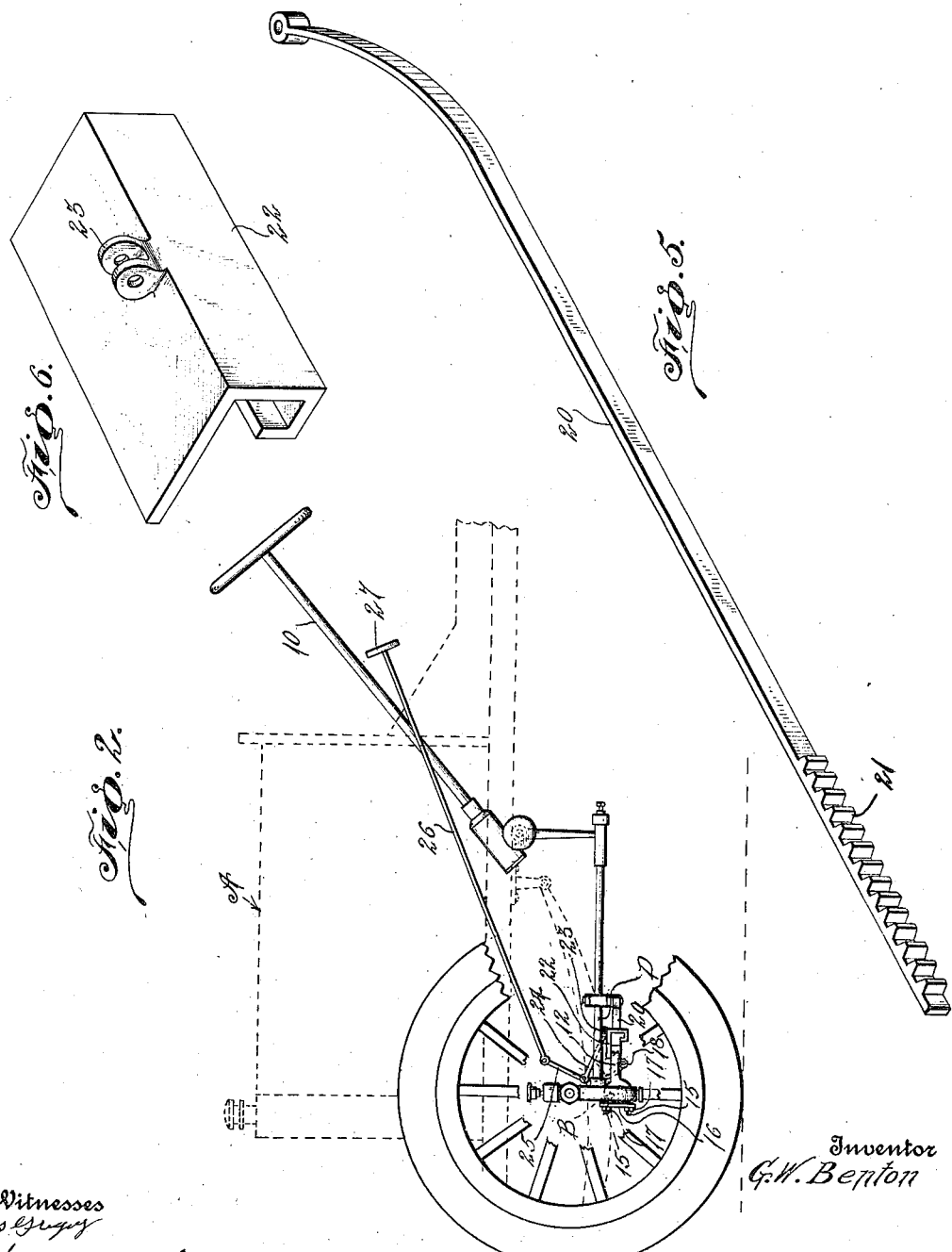

UNITED STATES PATENT OFFICE.

GEORGE W. BENTON, OF FINLEY, NORTH DAKOTA.

AUTOMOBILE STEERING-MECHANISM LOCK.

1,004,973.  Specification of Letters Patent.  Patented Oct. 3, 1911.

Application filed January 26, 1911. Serial No. 604,803.

*To all whom it may concern:*

Be it known that I, GEORGE W. BENTON, a citizen of the United States, residing at Finley, in the county of Steele, State of North Dakota, have invented certain new and useful Improvements in Automobile Steering-Mechanism Locks; and I do hereby declare the following to be a full, clear, and exact description of the invention, such as will enable others skilled in the art to which it appertains to make and use the same.

This invention relates to automobile steering mechanism locks.

The object of the invention resides in the provision of a device of the character named by which the steering mechanism of the automobile may be locked in any desired adjustment so as to prevent the sudden turning of the forward wheels of the automobile when the same is passing over abnormal obstructions disposed in the roadway.

A further object of the invention resides in the provision of a device of the character described which will be simple in construction, efficient in use and which may be manufactured and applied to any type of automobile at an exceedingly small cost.

With these and other objects in view, the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views; and in which, Figure 1 is a plan view of the forward end of an automobile showing the invention associated therewith, the body of the automobile being shown in dotted lines; Fig. 2, a side elevation of what is shown in Fig. 1 with the body of the automobile in dotted lines; Fig. 3, a section on the line 3—3 of Fig. 1; Fig. 4, a detail perspective view of the fixed toothed bar of the device; Fig. 5, a detail perspective view of the movable toothed bar; and Fig. 6, a detail perspective view of the guide bar which supports the free end of the movable toothed bar.

Referring to the drawings, A indicates the body of the automobile, B the forward axle, and C and D the steering knuckles carried at the ends of the axle B respectively. The steering knuckles C and D are operated in the usual manner by means of the rotation of the steering shaft 10 which is operatively connected with the arm 11 of the steering knuckle C.

Secured to the axle B is a fixed toothed bar 12, the terminals of which are bent at an angle to the intermediate portion and terminate in forked ends 13 and 14 which receive the axle B. These ends 13 and 14 have the free terminals of their arms threaded as at 15, and mounted upon these threaded ends is a plate 16 bound in place by the nuts 17. The bar 12 is provided on its lower side with spaced ears 18 for a purpose that will presently appear.

Pivotally connected to an arm 19 of the knuckle C is a bar 20 which has formed on one face teeth 21 disposed adjacent the teeth of the bar 12. This bar 20 is mounted for a longitudinal sliding movement in a guide member 22 which is of substantially L shape in cross section and has the free end of its long arm resting on the upper side of the toothed bar 12. By this construction it will be apparent that when the teeth 21 are out of interlocking engagement with the teeth of the bar 12, the bar 20 is capable of a longitudinal sliding movement in the guide member 22 in response to the movements of the knuckle C. It will also be equally apparent that when the bar 20 is swung on its pivot so as to move the teeth 21 into interlocking engagement with the teeth of the bar 12, said bar 20 will be locked against longitudinal movement, which in turn will secure all the parts of the steering mechanism of the automobile against movement by reason of the connection between the arm 19 of the steering knuckle C and the bar 20. In order to effect the movement of the bar 20 so as to cause the teeth 21 to interlock with the teeth of the bar 12, there is provided on the upper side of the guide member 22 a pair of spaced ears 23 in which is pivoted one end of the link 24. An angle lever 25 has one end pivoted between the ears 18 and is pivotally connected to the link 24 at the angle of said lever 25. The other end of the angle lever 25 is pivotally connected to a foot lever rod 26 which extends through the dashboard of the automobile and terminates in a foot pedal 27. This foot lever rod 26 is normally held in position to hold the teeth 21 out of engagement with the teeth of the bar 12 by means of a spring 28 which influences the angle lever 25 and in turn the link 24 and guide member 22.

By pressing the pedal 27 with the foot, it will be apparent that the rod 26 will be moved longitudinally. This movement of the rod 26 will swing the angle lever 25 so as to draw the guide member 22 and the bar 20 carried thereby toward the bar 12 through the instrumentality of the link connection 24 between the angle lever and the guide member. This movement, as will be apparent, will effect the interlocking engagement between the teeth 21 and the teeth of the bar 12 and thus lock the steering mechanism of the automobile.

What is claimed is:—

In a device of the character described, the combination with the steering mechanism, front axle and steering knuckles of an automobile, of a toothed bar fixed on said axle, a movable toothed bar connected to one of the steering knuckles, and means for forcing the teeth of the movable bar into engagement with the teeth of the fixed bar, whereby the movable bar is locked against movement under the influence of the movement of the steering knuckles to which it is connected.

In testimony whereof, I affix my signature, in presence of two witnesses.

GEORGE W. BENTON.

Witnesses:
E. H. GILBERTSON,
E. TAISEY.